United States Patent
Hamade

(10) Patent No.: US 8,544,257 B2
(45) Date of Patent: Oct. 1, 2013

(54) ELECTRICALLY STIMULATED CATALYTIC CONVERTER APPARATUS, AND METHOD OF USING SAME

(76) Inventor: Thomas A. Hamade, Dearborn Heights, MI (US)

( * ) Notice: Subject to any disclaimer, the term of this patent is extended or adjusted under 35 U.S.C. 154(b) by 181 days.

(21) Appl. No.: 12/449,707

(22) PCT Filed: Feb. 22, 2008

(86) PCT No.: PCT/US2008/054727
§ 371 (c)(1),
(2), (4) Date: Mar. 19, 2010

(87) PCT Pub. No.: WO2008/103909
PCT Pub. Date: Aug. 28, 2008

(65) Prior Publication Data
US 2010/0186376 A1    Jul. 29, 2010

Related U.S. Application Data

(60) Provisional application No. 60/891,281, filed on Feb. 23, 2007.

(51) Int. Cl.
*F01N 3/00* (2006.01)

(52) U.S. Cl.
USPC .......................................................... 60/275

(58) Field of Classification Search
USPC ...................................... 60/275; 422/186.04
See application file for complete search history.

(56) References Cited

U.S. PATENT DOCUMENTS

| | | | |
|---|---|---|---|
| 4,643,745 A * | 2/1987 | Sakakibara et al. | 96/76 |
| 4,967,119 A * | 10/1990 | Torok et al. | 315/111.91 |
| 5,012,094 A | 4/1991 | Hamade | |
| 5,077,468 A | 12/1991 | Hamade | |
| 5,112,466 A * | 5/1992 | Ohta et al. | 204/298.05 |

(Continued)

FOREIGN PATENT DOCUMENTS

| CN | 1584303 A | 2/2005 |
|---|---|---|
| CN | 1633550 A | 6/2005 |
| KR | 2002-0004396 A | 1/2002 |

OTHER PUBLICATIONS

English translation of KR 2002-0004396 A.*

(Continued)

*Primary Examiner* — Thomas Denion
*Assistant Examiner* — Jason Shanske
(74) *Attorney, Agent, or Firm* — Carrier Blackman & Associates, P.C.; William D. Blackman; Joseph P. Carrier

(57) ABSTRACT

The present invention provides an electrically stimulated catalytic converter for treating engine exhaust from a vehicle engine. The electrically stimulated catalytic converter includes an exhaust conduit having one end thereof adapted to be connected to an exhaust pipe, and the other end thereof opened to the atmosphere outside the vehicle or connected to a reduced-size catalytic converter; and a corona charger apparatus operatively connected to the exhaust conduit. The corona charger apparatus is housed with a housing unit disposed between the ends the exhaust conduit. The corona charger is intrusively or non-intrusively associated with a main flow path defined by the exhaust conduit. The corona charger includes at least one electrode which may be recessed away from the main flow path. A plurality of corona chargers may be used in various combinations. The electrically stimulated catalytic converter is adapted to reduce exhaust pollution.

7 Claims, 15 Drawing Sheets

(56) References Cited

U.S. PATENT DOCUMENTS

| | | |
|---|---|---|
| 5,118,942 A | 6/1992 | Hamade |
| 6,475,350 B2* | 11/2002 | Palekar et al. ............... 204/164 |
| 6,558,637 B2* | 5/2003 | Tamura et al. ........... 422/186.04 |
| 2002/0076368 A1* | 6/2002 | Hemingway et al. .... 422/186.04 |
| 2003/0140616 A1* | 7/2003 | Twigg et al. .................... 60/275 |
| 2004/0093853 A1* | 5/2004 | Hemingway et al. ........... 60/275 |
| 2004/0094401 A1* | 5/2004 | Carlow et al. ................. 204/168 |
| 2004/0173450 A1 | 9/2004 | Fisher et al. |
| 2005/0031513 A1* | 2/2005 | McNamara et al. ....... 423/215.5 |
| 2005/0147541 A1 | 7/2005 | Ajisaka et al. |
| 2006/0113181 A1* | 6/2006 | Hirata et al. .................. 204/173 |
| 2006/0119278 A1* | 6/2006 | Kaneko et al. ........... 315/111.21 |
| 2006/0187609 A1 | 8/2006 | Dunn |

OTHER PUBLICATIONS

Notification of the First Office Action, dated Dec. 7, 2011, from the State Intellectual Property Office of the People's Republic of China, for corresponding Chinese Application 200880005934.7. In Chinese, with English translation.

* cited by examiner

US 8,544,257 B2

ELECTRICALLY STIMULATED CATALYTIC CONVERTER APPARATUS, AND METHOD OF USING SAME

CROSS-REFERENCE TO RELATED APPLICATIONS

The present application is a U.S. National Phase application of, and claims priority based on, International Application PCT/US2008/054727, filed on Feb. 22, 2008, which, in turn, claims priority benefit under 35 USC §119 of U.S. Provisional Patent Application 60/891,281, filed on Feb. 23, 2007. The entire subject matter of both the referenced international application and the referenced provisional application is incorporated by reference herein.

BACKGROUND OF THE INVENTION

1. Field of the Invention

The present invention relates to an electrically stimulated catalytic converter apparatus for treating engine exhaust from an internal combustion engine of a vehicle, to reduce pollutants which may be present therein. More particularly, the present invention relates to an electrically simulated catalytic converter employing a high-voltage electrical corona for treating engine exhaust, where the corona may be used either with or without a conventional ceramic monolith-type converter-type converter which is reduced in size.

2. Description of the Background Art

In motor vehicle exhaust systems, catalytic converters are widely used to reduce unwanted emissions from internal combustion engines. Catalytic converters are also used on many engine-equipped machines including generator sets, forklifts, mining equipment, trucks, buses, trains, etc., to treat the engine exhaust from engines of these machines to reduce pollutants in the exhaust.

A catalytic converter provides an environment for supporting a chemical reaction, wherein unwanted gaseous combustion by-products from an internal combustion engine are converted to more inert gases, which are generally discharged into the atmosphere outside the vehicle. A catalytic converter promotes the conversion of unwanted exhaust gases through a dense honeycomb coated with precious metals such as platinum, palladium and/or rhodium. In the conventional catalytic converter, gases such as nitrous oxides, carbon monoxide and unburned hydrocarbons are converted into reaction products such as nitrogen gas, carbon dioxide, water, etc.

However, when engine exhaust contains excessive amount of unwanted contaminants including high levels of nitrous oxides, carbon monoxide and unburned hydrocarbons, conventional catalytic converters may not be able to effectively treat/convert such excessive amount of unwanted contaminants to a safer, desired level. In such cases, it may be desired to pre-treat the engine exhaust prior to its passage through the conventional catalytic converter, and/or post-treat the engine exhaust after it is discharged from the catalytic converter, to reduce the volume of pollutants present in the engine exhaust to a safer, acceptable level.

For example, a plasma assisted catalytic reduction system—which is discussed in prior art in an online article entitled, "The Internal Combustion Engine at Work", hereafter referred as 'Westbrook' apparatus—has been proposed to reduce exhaust pollution from a diesel engine prior to the exhaust entering a conventional catalytic converter (see, for example, the article at http:/www.llnl.gov/str/Westbrook.html).

FIG. 1 shows a schematic view of the Westbrook apparatus—the plasma assisted catalytic reduction system 1 having a metal wire electrode 2 placed longitudinally within the center of a cylindrical metal exhaust pipe 3, upstream of a conventional catalytic converter 4. In this known system, a non-thermal plasma is produced inside the exhaust pipe 3 by a short pulse of high-voltage applied to the wire electrode 2. According to the Westbrook article referred to above, the non-thermal plasma produced by the electrode 2 oxidizes nitric oxide and hydrocarbons to nitrogen dioxide and partially oxidized hydrocarbons, and subsequently, the conventional catalytic converter converts the nitrogen dioxide and hydrocarbons to nitrogen, carbon dioxide and water.

FIG. 2 shows the results of spectrographic analysis of exhaust emissions treated with the Westbrook apparatus, demonstrating the benefits of plasma-assisted catalytic reduction. Westbrook asserts that plasma plus catalysis almost completely eliminates unwanted exhaust emissions from diesel engines.

The charging technique by employing the Westbrook apparatus as discussed above is an intrusive technique, i.e., the wire electrode 2 is disposed within a main flow path of the engine exhaust, in a configuration substantially parallel to exhaust flow. Since the wire electrode 2 of Westbrook is not recessed away from the main flow path of the engine exhaust, the wire electrode 2 may be subjected to contamination from engine exhaust, and contaminants could build up on the single wire electrode 2 due its direct exposure to the engine exhaust. Therefore, such a single-wire corona charger may not be optimally effective, over the long term, in reducing contaminants from the engine exhaust.

Further, corona charge around a single wire electrode placed longitudinally within the exhaust conduit may not cover entire the cross-sectional area of a main flow path defined within the exhaust conduit. As a result, the entire flow of the engine exhaust may not interact with and/or pass through the corona charge, which may render such configuration of the corona charger ineffective for its intended purpose of reducing contaminants from the engine exhaust.

Also, intrusive devices such as Westbrook apparatus, as discussed above, may require cumbersome and time-consuming procedures for mounting thereof within the exhaust conduit.

The plasma-assisted catalytic reduction system requires application of a conventional catalytic converter in conjunction with a single-wire corona generator, and therefore, the Westbrook apparatus may not effective without application of a conventional catalytic converter to reduce the unwanted components present in the engine exhaust. The plasma assisted catalytic reduction system employing only a single wire electrode may not be used as a stand alone unit to treat the engine exhaust to reduce unwanted components thereof.

One example of an electrostatic charging apparatus, used in the context of air filtration, is described in U.S. Pat. No. 4,853,005 to Jaisinghani et al. In addition, several combinations of electrostatic charging apparatus employing corona chargers for various applications including treatment/purification of biological substances, waste water, combustible fluid, etc., are discussed in U.S. Pat. Nos. 5,118,942 issued to Hamade on Jun. 2, 1992; 5,077,468 issued to Hamade on Dec. 31, 1991; and 5,012,094 issued to Hamade on Apr. 30, 1991; and the disclosures of each of these three prior patents to Hamade are incorporated entirely by reference herein.

Although the known devices are usable for their intended purposes, a need still exists in the art for a corona charger device which is usable for treating engine exhaust to reduce unwanted components thereof. In particular, there is a need for an electrically simulated catalytic converter apparatus which will overcome difficulties and shortcomings encountered with the known art.

SUMMARY OF THE INVENTION

Accordingly, the present invention provides an electrically stimulated catalytic converter for treating engine exhaust, to reduce unwanted components thereof, from engine-equipped machines such as motorcycle, cars, trucks, buses, trains, generator sets, forklifts, mining equipment, marine vehicle, aircrafts, etc.

The electrically simulated catalytic converter includes an exhaust conduit having a first end and a second end, and defines a main flow path therethrough, at least one corona charger apparatus and a reduced-size ceramic monolith-type converter-type converter. However, according to the present invention, the reduced-size ceramic monolith-type converter-type converter may be included as an optional feature and not as an essential feature.

The first end of the exhaust conduit is adapted to be connected to an exhaust pipe and the second end of the exhaust conduit is connected to the exhaust system, or left open for discharging treated engine exhaust outside the vehicle. The corona charger apparatus is operatively connected to the exhaust conduit and disposed between the first end and the second end thereof. The corona charger apparatus is disposed within a housing unit, and includes at least one electrode—which may be is a shape of a wire, a rod, a needle, zigzagged wire/rod, irregularly shaped structure—connected to a voltage supply unit. When energized, the corona charger apparatus is operable to produce charged gaseous molecules which interact with the engine exhaust upstream of the catalytic converter.

The electrodes formed of a material selected from the group consisting of tungsten, platinum, alloys of tungsten, alloys of platinum and mixtures thereof. The electrodes of the corona charger apparatus may or may not be recessed away from the main flow path of the engine exhaust. That is, the electrodes of the corona charger apparatus may either be intrusive or non-intrusive of the main flow path.

The housing unit may be a substantially cylindrical housing, having a corona charger apparatus housed there within, disposed around the periphery of the exhaust conduit.

The electrically stimulated catalytic converter may also include a pre-charger unit, having at least one electrode connected to the voltage supply unit, disposed in the main flow path of the engine exhaust upstream of the corona charger apparatus. The electrically stimulated catalytic converter may also include a post-charger unit disposed downstream of the corona charger apparatus and/or the catalytic converter.

The electrically simulated catalytic converter may include more than one corona charger apparatuses. When more than one corona charger apparatuses are configured, they may be disposed parallel or in series or in staggered combination with each other, between the first and the second end of the exhaust conduit.

The electrically stimulated catalytic converter may additionally include a fluid/air source unit disposed at one end of the housing unit of the corona charger. The fluid/air source unit adapted to blow a fluid/air over the electrodes of the corona charger. The fluid/air source unit includes a compressor adapted to generate higher fluid pressure than the pressure of engine exhaust flowing via the exhaust conduit.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

Illustrative embodiments of the present invention of the electrically simulated catalytic converter will be better understood when consideration is given to the detailed description of the accompanying drawings, wherein like elements bear like reference numerals.

DETAILED DESCRIPTION OF ILLUSTRATIVE EMBODIMENTS

It should be understood that only structures considered necessary for clarifying the selected illustrative embodiments of the present invention are described herein. Other conventional structures, and those of ancillary and auxiliary components of the system, are assumed to be known and understood by those skilled in the art.

First Embodiment

Figure 1:
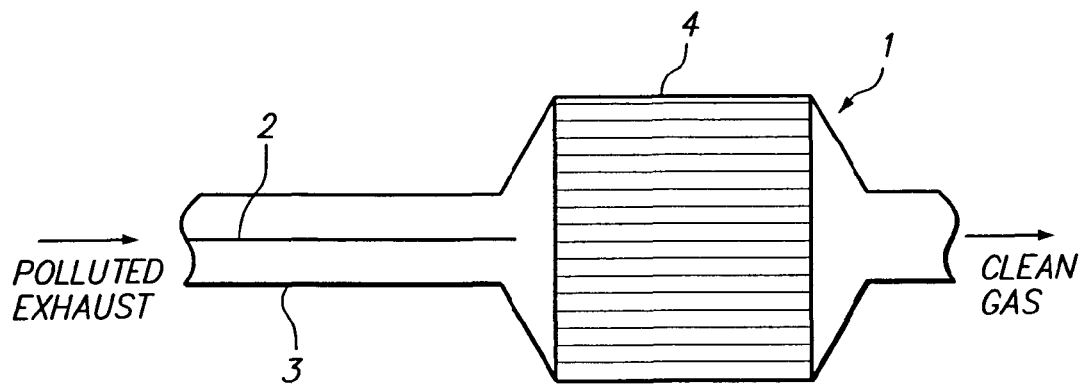
FIG. 1 is a prior art showing a schematic of plasma-assisted catalytic reduction system.
Figure 2:
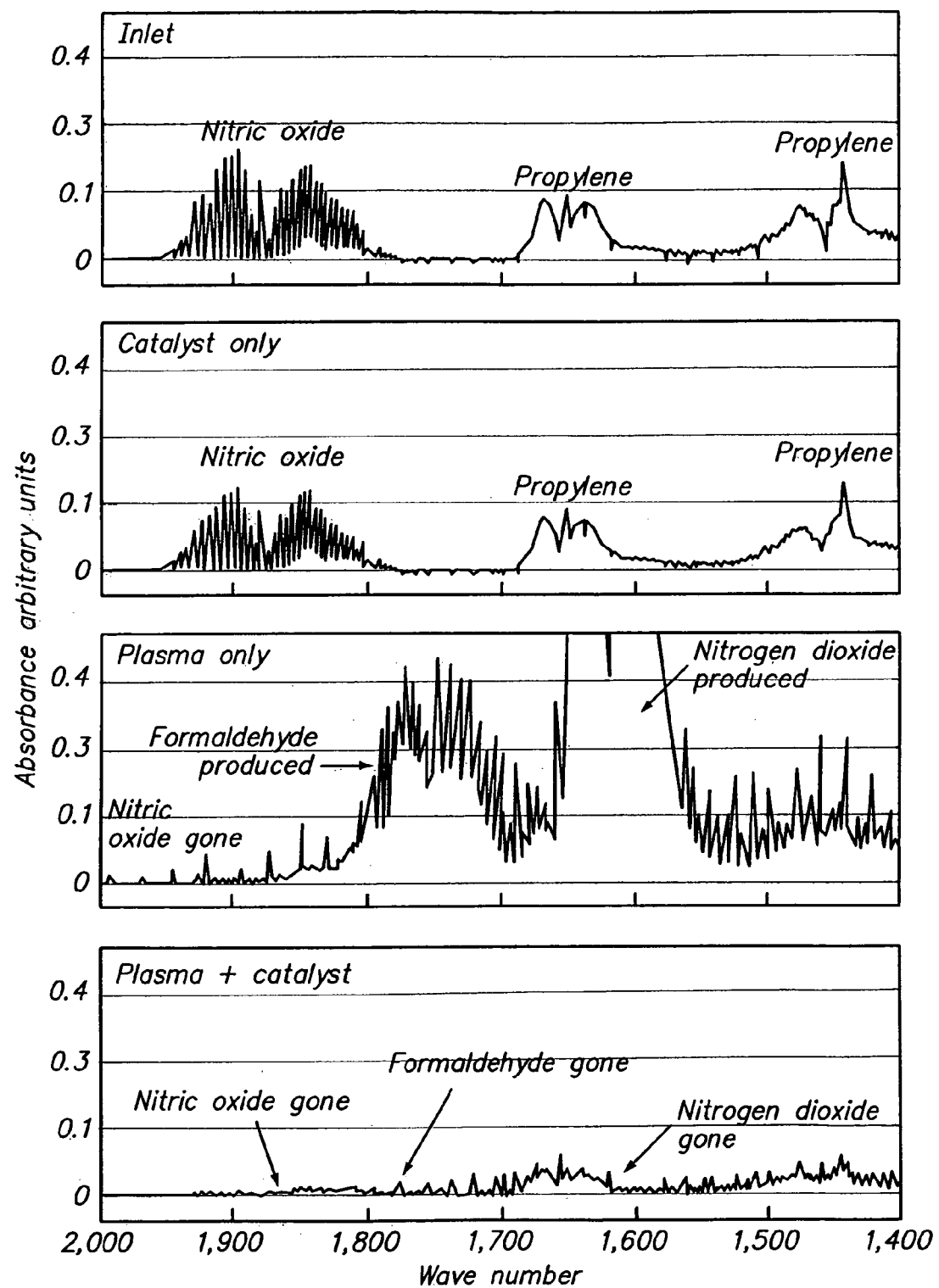
FIG. 2 is a prior art showing spectrographic analysis of the exhaust emission with and without the plasma-assisted catalytic reduction system.
Figure 3:
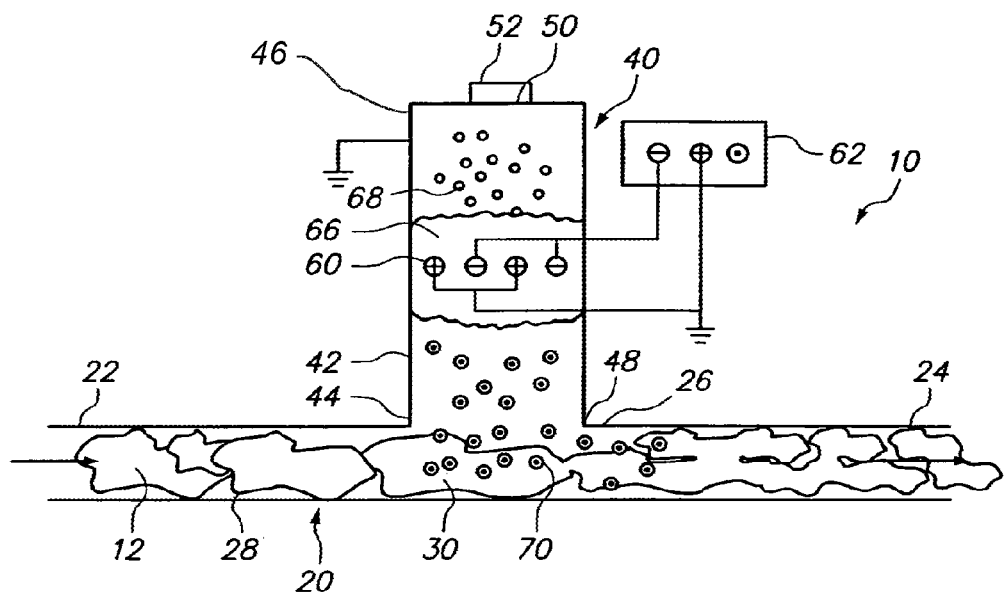
FIG. 3 is a schematic of first embodiment of electrically stimulated catalytic converter constructed according to the objects of the present invention.

A schematic of an electrically stimulated catalytic converter apparatus according to a first embodiment of the present invention is shown in FIG. 3. As shown in FIG. 3, the electrically stimulated catalytic converter 10 of the present invention—for treating engine exhaust 12 from a vehicle engine—includes an exhaust conduit 20 and a corona charger apparatus 40 operatively connected to, and in fluid communication with, the exhaust conduit 20.

The exhaust conduit 20 includes a first end 22, a second end 24, and an opening 26 (which may be a one-way opening only inward of the exhaust conduit) formed thereon between the first end 22 and the second end 24. The first end 22 of the exhaust conduit 20 is adapted to be operatively connected to an exhaust pipe (not shown) on a vehicle, such as a car or truck. The exhaust conduit 20 defines a main flow path 28 therethrough for flow of the engine exhaust 12 from the first end 22 to the second end 24 thereof.

The second end 24 of the exhaust conduit 20 is open to the atmosphere, and is operable to release treated, modified engine exhaust in the atmosphere outside the vehicle.

The corona charger apparatus 40 (also referred as an electrostatic charging device) is operatively connected to the exhaust conduit 20 via the opening 26 thereof. The corona charger apparatus 40 is housed within a housing unit 42. The housing unit 42 may have a substantially cylindrical, rectangular or other regular cross-sectional shape. The housing unit 42 is disposed between the first end 22 and the second end 24 of the exhaust conduit 20.

The housing unit 42 includes two end portions—a first (proximal) end portion 44, adjacent the exhaust conduit 20, and a second (distal) end portion 46, disposed opposite to the first end portion 44 and spaced away from the exhaust conduit 20. A first opening 48 is formed at the first end portion 44 which allows the corona charger apparatus 40 to be operatively connected with the exhaust conduit 20, via the opening 26 thereof. The second end portion 46 may be a closed portion or may include a second opening 50 formed thereon. The second opening 50 allows for operatively connecting a fluid/air flow source unit 52 to the corona charger apparatus 40 for optionally supplying fluid/air at a required pressure to the corona charger apparatus, if required. Where a fluid/air flow source unit 52 is used, the gaseous molecules are blown by the fluid/air source towards electrodes 60.

The corona charger apparatus 20 includes one or more electrodes 60 electrically connected to a voltage supply unit 62. The electrodes 60 are high-voltage electrodes. In this first embodiment, the electrodes 60 are recessed away from the main flow path 28 of the engine exhaust 12. In other words, in the embodiment of FIG. 3, the electrodes 22 of the corona chargers apparatus 20 are non-intrusive of the main flow path 28, thereby reducing contamination of the electrodes 60 by the engine exhaust 12.

The electrodes 60 of the corona charger apparatus 40 are energized by supplying a high-voltage thereto, generally in the range of 1-10 kV from the voltage supply unit 24. However, the voltage supplied to the electrodes is not limited to this range, and it may be more or less than this range. The magnitude of voltage is selected such that an unwanted spark is not developed when such high-voltage is supplied to the electrodes. That is, the magnitude voltage is selected which is near, yet which is just below a spark-over voltage.

When energized, the corona charger apparatus 40 is operable to produce a uniform electrical corona 66 in the vicinity of the electrodes 60, which charges gaseous molecules passing through the corona. Such charged gaseous molecules 70 flow towards the main flow path 28 via the first opening 48 of the housing of the corona charger apparatus, and the opening 26 of the exhaust conduit 20. The charged gaseous molecules (ions) 70 interact with the engine exhaust 12 in a mixing zone 30 in the main flow path 28. The interaction of gaseous molecules with molecules of the engine exhaust lowers unwanted components of the engine exhaust.

The electrodes 60 of the corona charger apparatus 40 are formed of a material selected from the group consisting of tungsten, platinum, palladium, rhodium, alloys of tungsten, alloys of platinum, alloys of palladium, alloys of rhodium, and mixtures of any of the above. A suitable non-corroding conductive substance may be preferred for forming the electrodes. However, since electrodes 60 are non-intrusive of the main flow path 28 of the engine exhaust 12, they may be made from other material, if desired.

Figure 4:
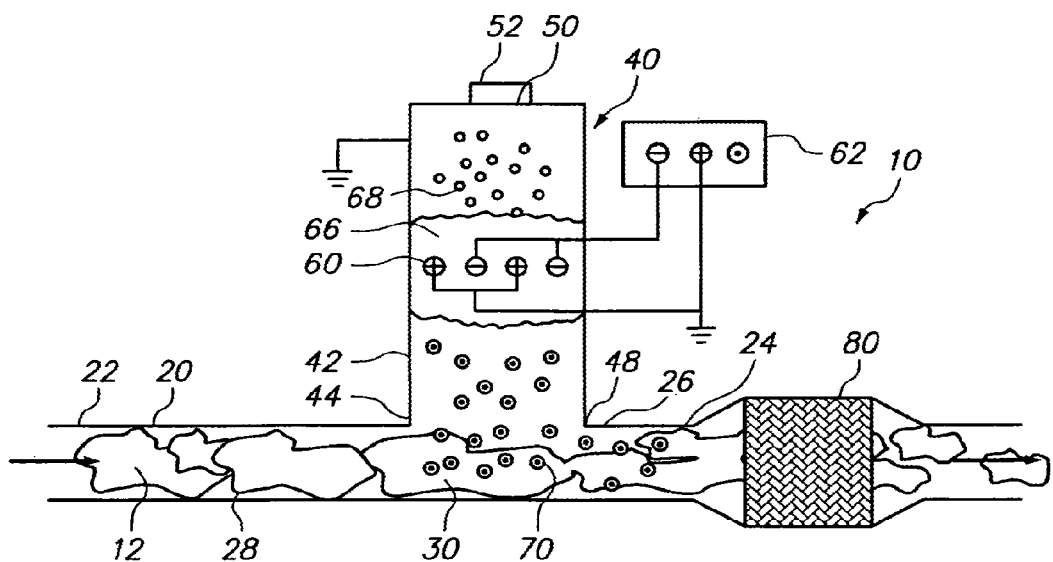
FIG. 4 is a schematic of another embodiment of electrically simulated catalytic converter having a reduced-size catalytic converter.

Referring now to FIG. 4, in an alternate embodiment of the present invention, an electrically stimulated catalytic converter 10 of the present invention may optionally include a porous ceramic monolith-type converter-type converter 80 coated with a catalytic metal of the type used in conventional catalytic converters. In this alternate embodiment, the ceramic monolith-type converter is connected to the second end 24 of the exhaust conduit 20, as shown in FIG. 4. That is, according to the present invention, application of a conventional ceramic monolith-type converter 80 is not essential requirement for treating engine exhaust but is an optional one.

Figure 5:
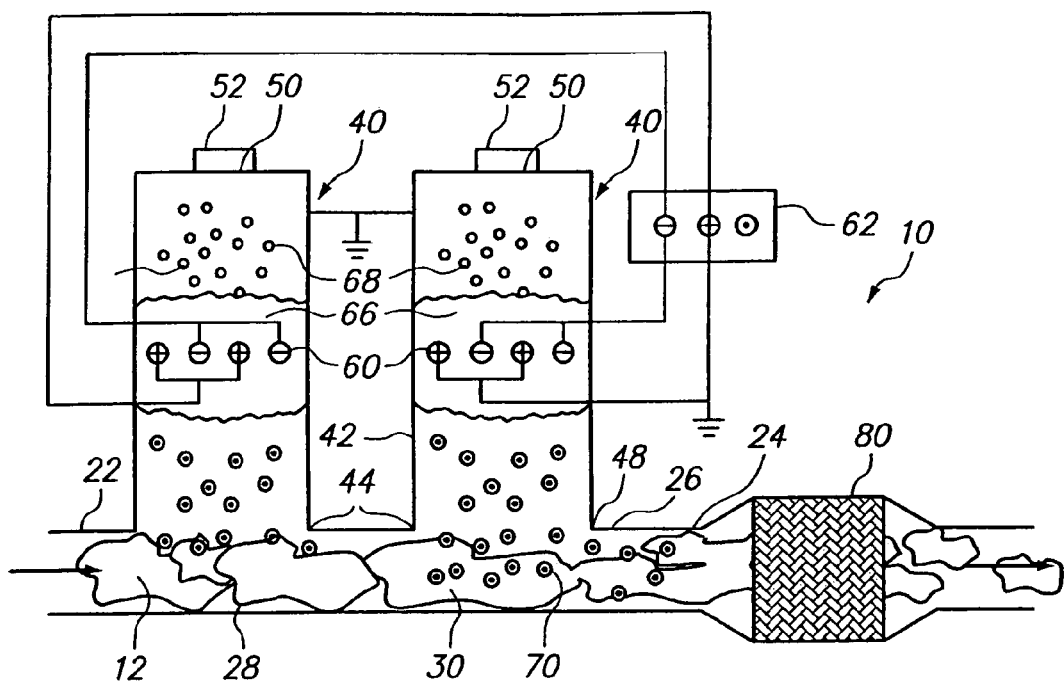
FIG. 5 is a schematic of another embodiment of electrically stimulated catalytic converter having two corona charger apparatus disposed parallel to each other.
Figure 6:
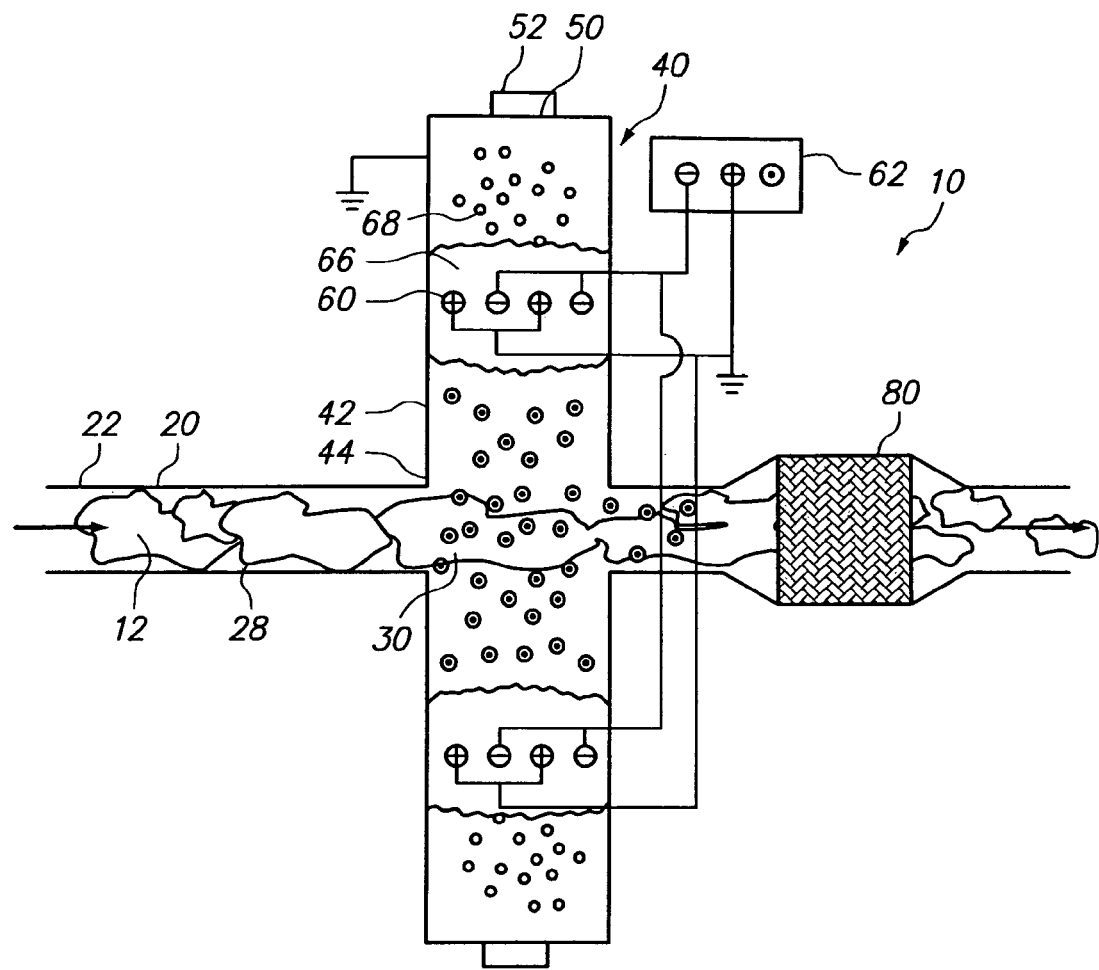
FIG. 6 is a schematic of another embodiment of electrically stimulated catalytic converter having two corona charger apparatus disposed on diametrically opposite sides of the exhaust conduit.

One or more corona chargers may be operatively connected to the exhaust conduit between the first and the second end thereof. When more than one corona charger apparatus is used, they may be disposed parallel to each other, as shown in FIG. 5, diametrically opposed to one another on the exhaust conduit, as shown in FIG. 6, or may be disposed in a staggered pattern.

Figure 7:
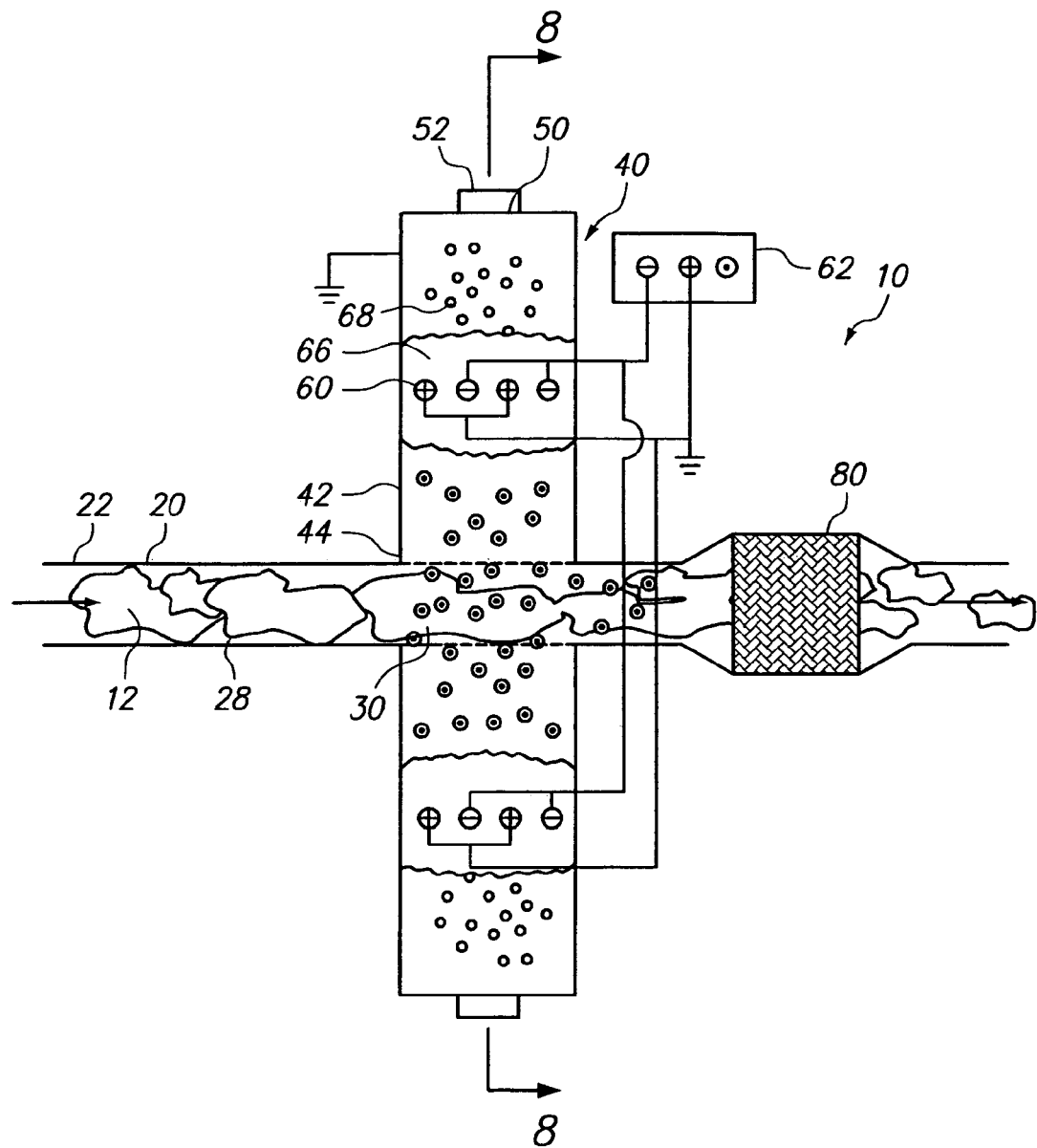
FIG. 7 is a schematic of another embodiment of electrically stimulated catalytic converter having a corona charger apparatus disposed around the exhaust conduit.
Figure 8:
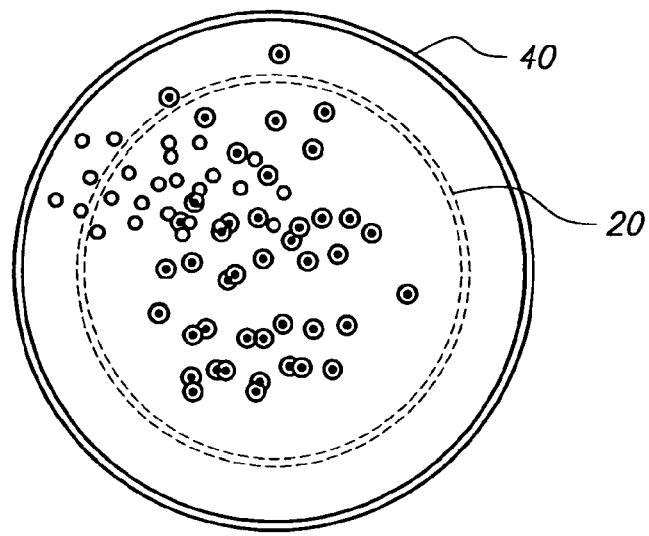
FIG. 8 is a cross sectional view taken along line 8-8 of FIG. 7.

The housing unit may be formed in a substantially cylindrical shape and disposed around the periphery of the exhaust conduit as shown in FIGS. 7 and 8.

Figure 9:
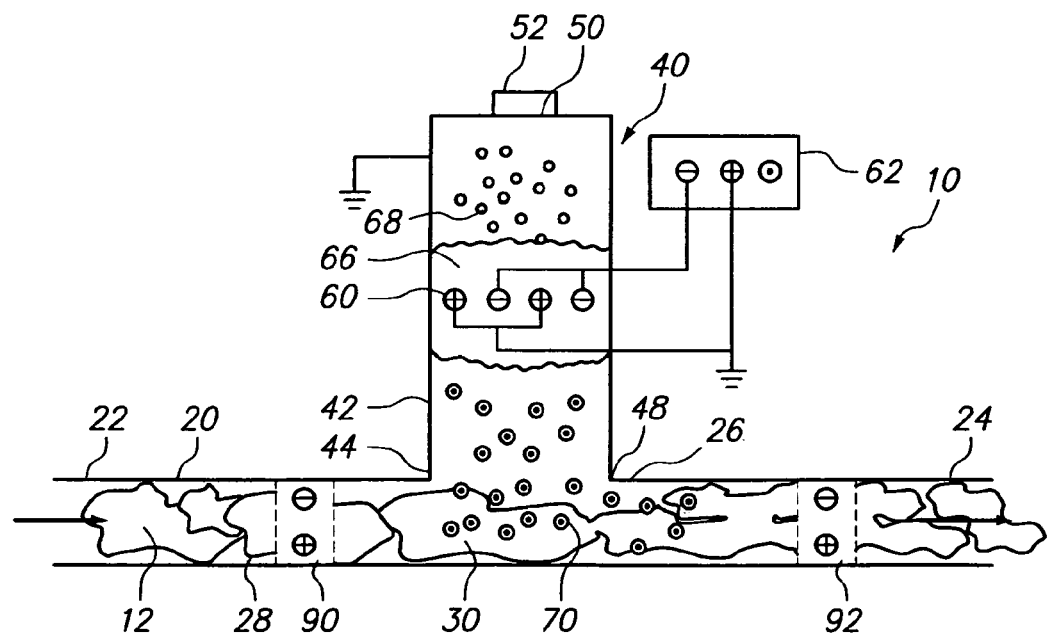
FIG. 9 is schematic of the electrically stimulated catalytic converter having pre-charger unit and a post-charger unit.

As shown in FIG. 9, the electrically stimulated catalytic converter may further include one or more pre-charger units 90 disposed in the main flow path of the engine exhaust upstream of the corona charger apparatus 40. The pre-charger unit 90 includes one or more electrodes connected to the voltage supply unit 62.

Further, as shown in FIG. 9, the electrically stimulated catalytic converter may further include one or more post-charger units 92 disposed in the main flow path of the engine exhaust downstream of the corona charger apparatus 40. The post-charger unit includes one or more electrodes connected to the voltage supply unit.

Without wishing to be bound by any theory, it is hypothesized that the newly proposed corona assisted catalytic converter, with or without an existing ceramic monolith-type converter, will have some self-cleaning tendencies, due to presence of the corona and the increased wire temperature due to current from a high voltage power source. The increased wire temperature should enable the combustion of any contaminants deposited on the electrodes, and in addition, will aid in increasing the catalytic chemical conversion. The presence of the corona and electrostatic electrical fields will also enhance the catalytic chemical conversion of pollutants into non-toxic gases. A firing high-voltage coil, such as that used in the ignition system, can be retrofitted to power the charger grid electrodes.

Any costs due to electrical requirements are expected to be offset by the gain in money saving due to reducing the size of, or eliminating traditional ceramic monolith-type catalytic converters.

It is believed that this new corona-assisted technology is much cheaper and easier to implement than the conventional catalytic converter. The replacement cost of the new invention is also expected to be much lower than the current existing replaced catalytic converters.

In summary and in addition to the economic benefits, the Electrically Stimulated Catalytic Converter (ESCC) according to the present invention offers the following technical advantages over conventional catalytic converters: reduced size, corona ions made of radical molecules that react with pollutants to convert them more rapidly into non-toxic gases, electrical fields polarization (dielectrophoretic forces) and electrophoretic forces charges and treat pollutants to more rapidly convert into non pollutant gases, same electrical forces and corona ions treat the catalytic converter, enhances and increases the catalytic active reaction sites) to more rapidly convert pollutants into non-toxic gases, and electrode wire grids increases reactor volume temperature due to application of high voltage currents through them, thereby increasing the reaction rate conversion of pollutants to non-toxic gases.

Second Embodiment

Figure 10:
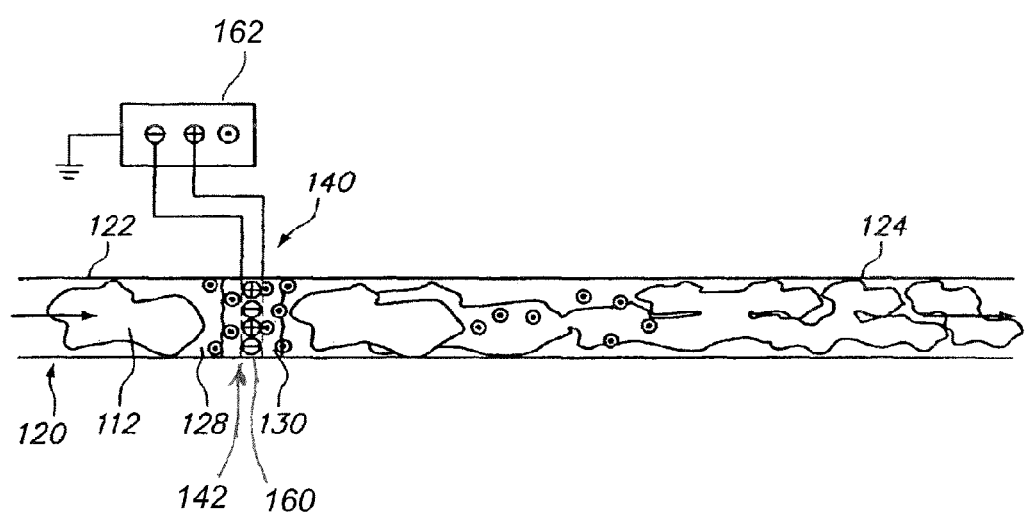
FIG. 10 is schematic of the electrically stimulated catalytic converter according to the second embodiment of the present invention.

A schematic of the second embodiment of the present invention is shown in FIG. 10. As shown in FIG. 10, the electrically stimulated catalytic converter 100 according to the second embodiment—for treating engine exhaust 112 from a vehicle engine—includes an exhaust conduit 120 and a corona charger apparatus 140 disposed within the exhaust conduit 120.

The exhaust conduit 120 includes a first end 122 and a second end 124. The first end 122 of the exhaust conduit 120 is adapted to be connected to an exhaust pipe (not shown). The exhaust conduit 120 defines a main flow path 128 therethrough for flow of the engine exhaust 112 from the first end 22 to second end 24 thereof.

The second end 124 of the exhaust conduit 120 is open to the atmosphere and is operable to release treated, purified engine exhaust in the atmosphere outside the vehicle.

The corona charger apparatus 140 (also referred as an electrostatic charging device) is disposed within the exhaust conduit 120 between the first end 122 and the second end 124 thereof. The corona charger apparatus 140 includes a housing unit 142 which is defined by a portion of the exhaust conduit 120. The housing unit 142 may include a plate shaped member with an opening formed within the member. The opening may be substantially cylindrical, oval or a rectangular opening.

Figure 11:
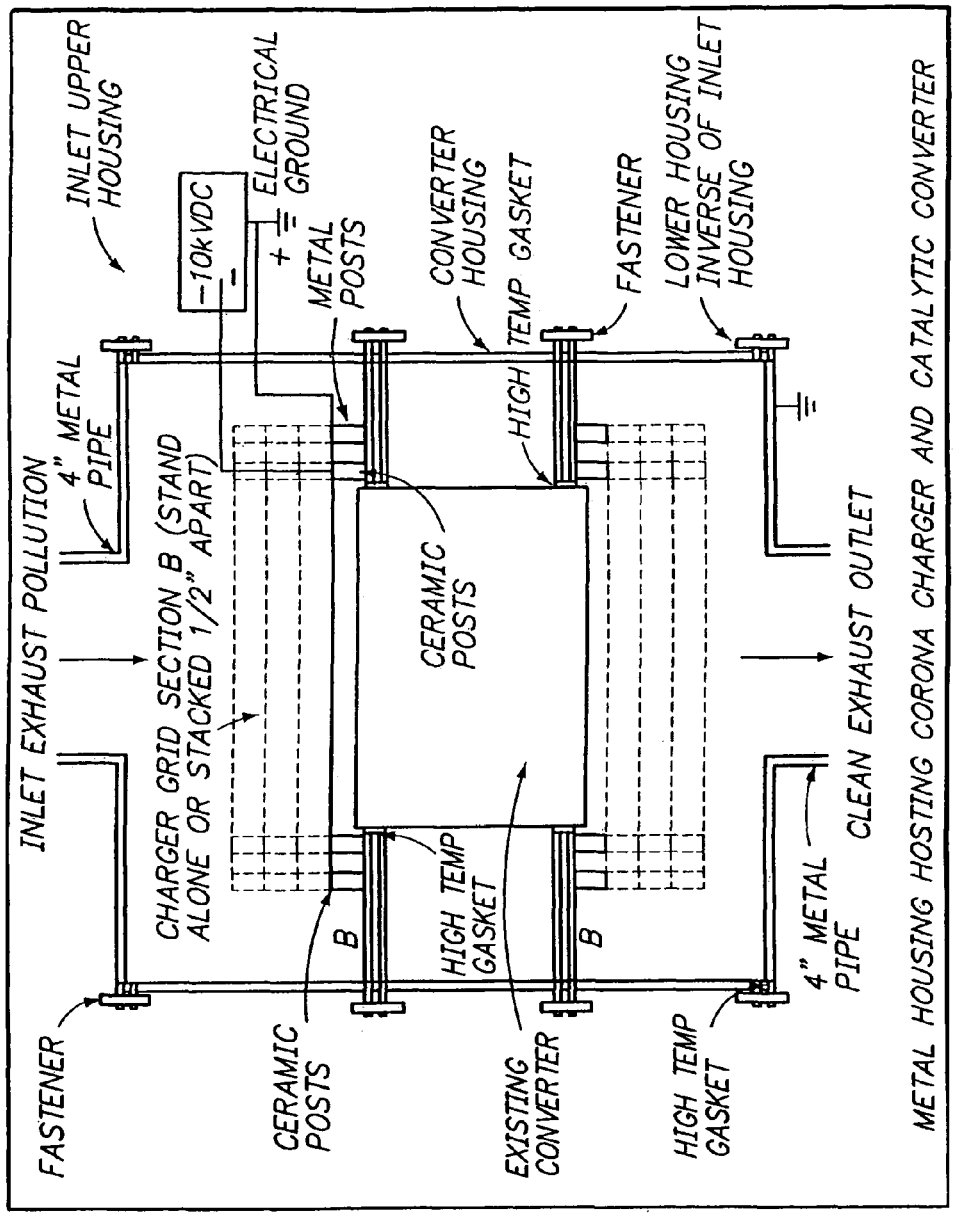
FIG. 11 is schematic of the electrically stimulated catalytic converter according to the second embodiment showing retrofitting of a corona charger into a conventional catalytic converter.
Figure 12:
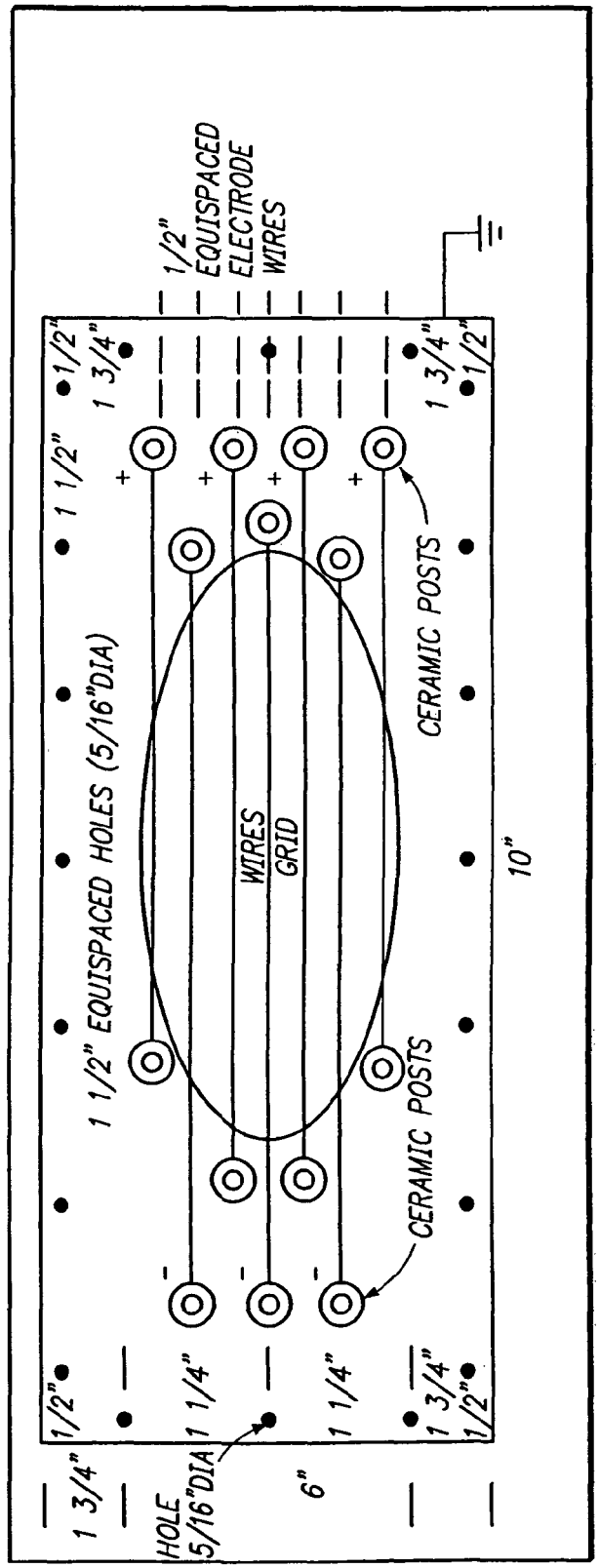
FIG. 12 is a schematic of a corona charger having plural equidistantly spaced electrodes formed on a plate-shaped member thereof.
Figure 13:
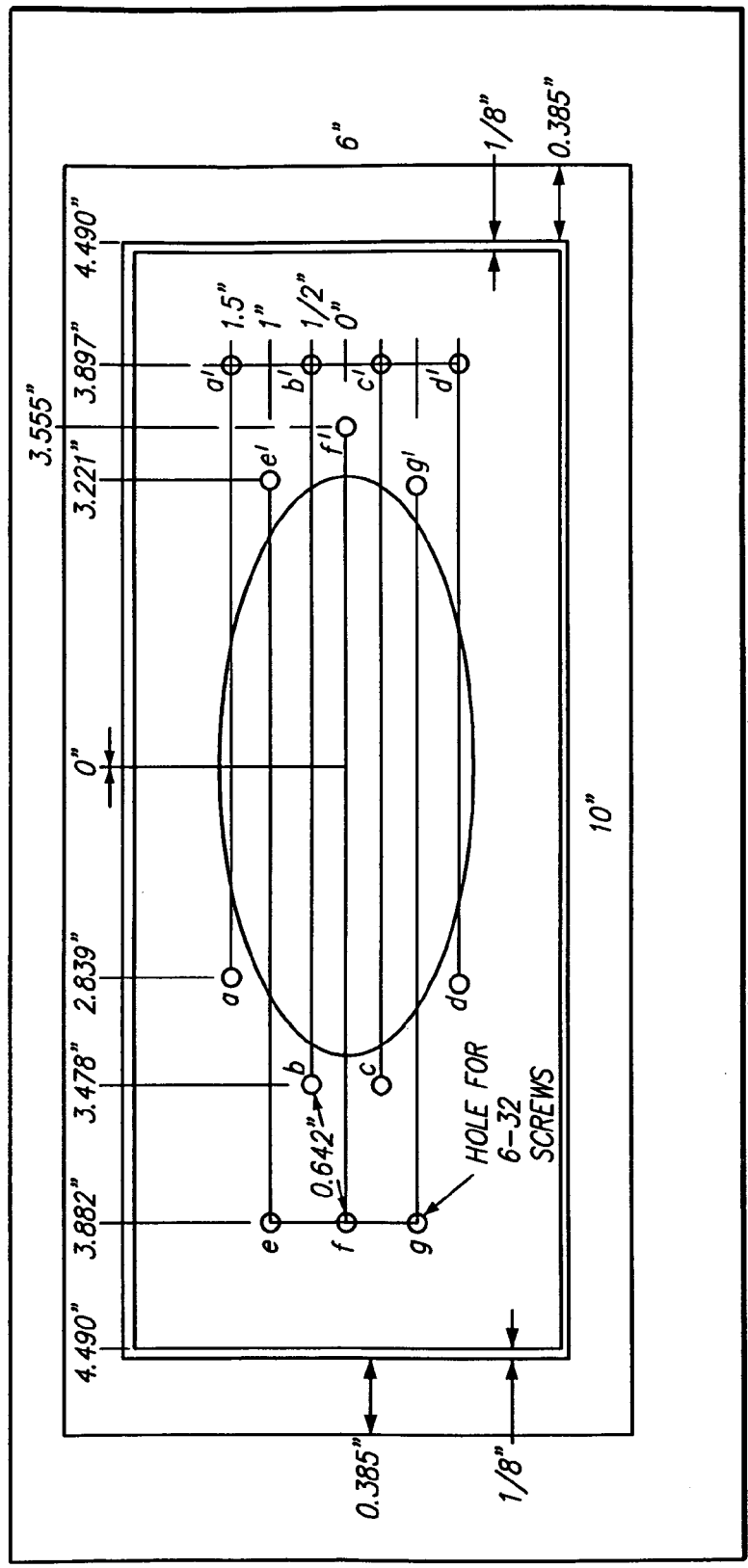
FIG. 13 is a view of holes formed on a plate-shaped member for placement of equidistantly spaced electrodes of FIG. 12.
Figure 14:
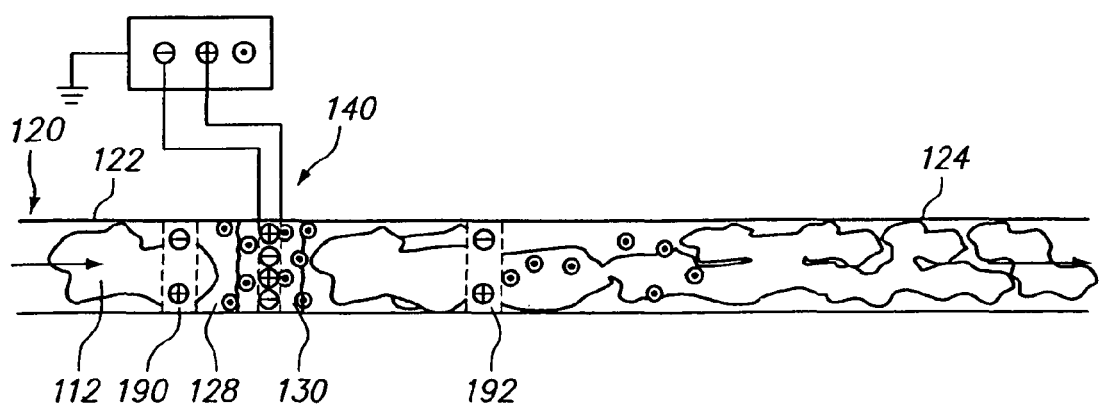
FIG. 14 is schematic of electrically stimulated catalytic converter according to the second embodiment having pre-charger unit and a post-charger unit.

The corona charger apparatus 120 includes one or more electrodes 160 disposed within the housing unit 142 and electrically connected to a voltage supply unit 162. The electrodes 160 are configured and designed to produce a corona that covers an entire cross sectional area of the main flow path 128 of the engine exhaust. In the embodiment of FIGS. 10-12, the corona charger apparatus 120, including electrodes 160 thereof, are intrusive of the main flow path 128. As seen in FIGS. 11-12, in one version of this second embodiment, the corona charger apparatus 120 includes a first charger grid section B disposed proximate an inlet of the housing 142 and including a plurality of spaced apart electrodes connected to the voltage supply unit 162, a second charger grid section B disposed proximate an outlet of the housing 142 and comprising a plurality of spaced apart electrodes connected to the voltage supply unit; and a catalytic converter, including a porous ceramic monolith disposed in the housing between the first and second charger grid sections. Optionally, if desired, each of the first and second charger grid sections may include a plurality of charger grids disposed in a stacked arrangement, each of the charger grids including a plurality of spaced apart electrodes.

During operation of the apparatus 120, charged gaseous molecules (ions) interact with the engine exhaust 112 in a mixing zone 130 disposed in the main flow path 128.

The electrodes 160 of the corona charger apparatus are energized by supplying a high-voltage thereto, generally in the range of 1-10 kV from the voltage supply unit 124. However, the voltage supplied to the electrodes is not limited to this range and it may be less or more than this range. The magnitude of voltage is selected such that unwanted spark is not developed when such high-voltage is supplied to the electrodes 160. That is, the magnitude voltage is selected such that it is just near spark over voltage. When energized, the corona charger apparatus 140 is operable to produce uniform corona 66, covering entire cross sectional area of the exhaust conduit 120, which charges engine exhaust molecules. The charging of exhaust molecules reduces unwanted components thereof.

The electrodes 160 of the corona charger apparatus 20 are formed of a non-corrosive material selected from the group consisting of tungsten, platinum, alloys of tungsten, alloys of platinum and mixtures thereof.

One or more corona charger apparatuses may be disposed between the first and the second end of the exhaust conduit. When more than one corona charger apparatuses are used, they may be disposed series within the exhaust conduit.

The electrically stimulated catalytic converter 120 of the present invention may optionally include a catalytic converter 180 connected to the second end 124 of the exhaust conduit 120. That is, according to the present invention, application of a convention catalytic converter is not an essential requirement for treating engine exhaust but is an optional.

The electrically stimulated catalytic converter may further include one or more pre-charger units disposed in the main flow path of the engine exhaust upstream of the corona charger apparatus. The pre-charger unit includes one or more electrodes connected to the voltage supply unit.

The electrically stimulated catalytic converter may further include one or more post-charger units disposed in the main flow path of the engine exhaust downstream of the corona charger apparatus. The post-charger unit includes one or more electrodes connected to the voltage supply unit.

Electrodes Patterns for Forming the Corona Charger Apparatus

Figure 15:
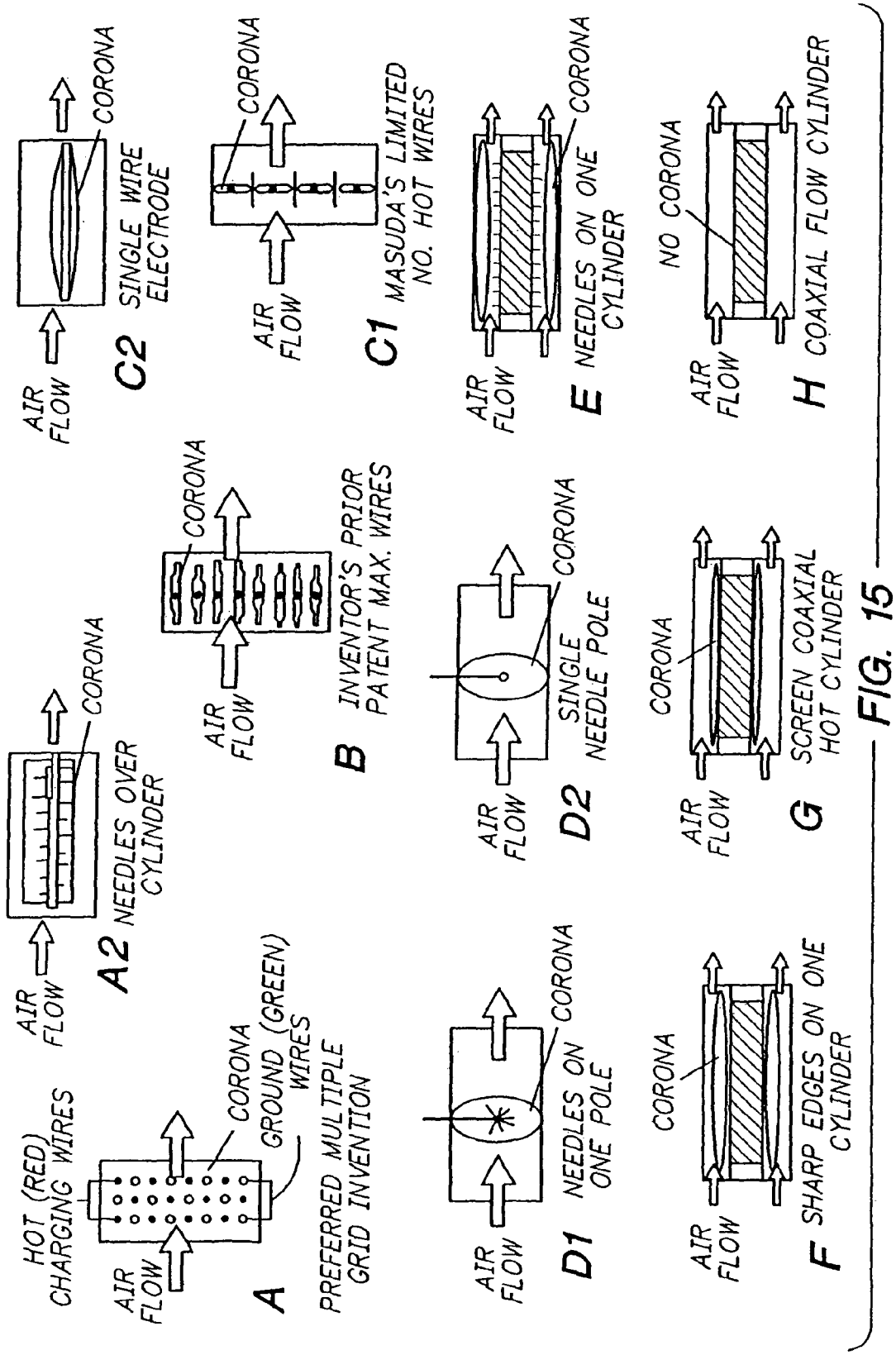
FIGS. 15-17 are views of various patterns of electrodes used in forming the corona charger apparatus of the present invention.
Figure 16:
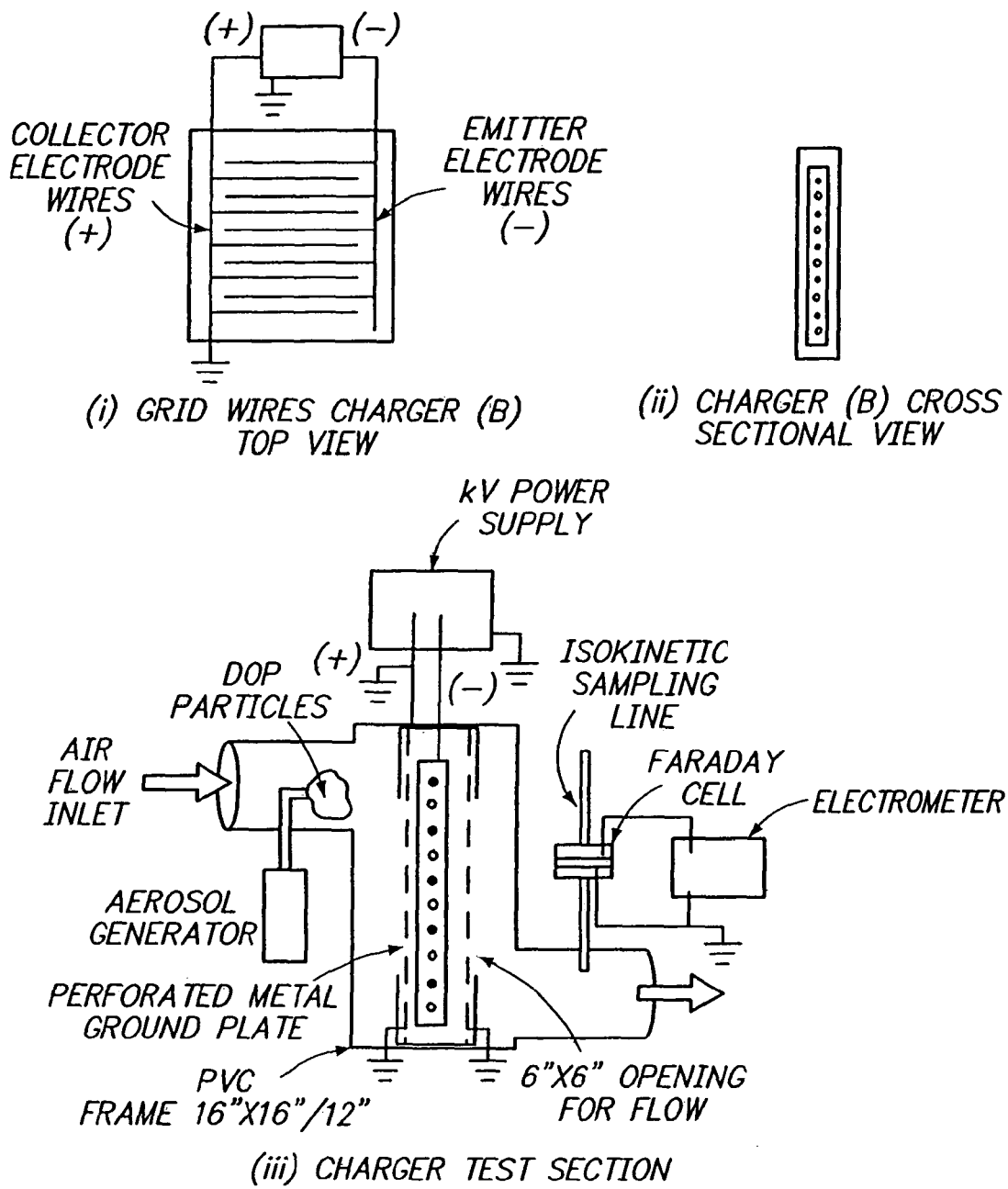
Figure 17:
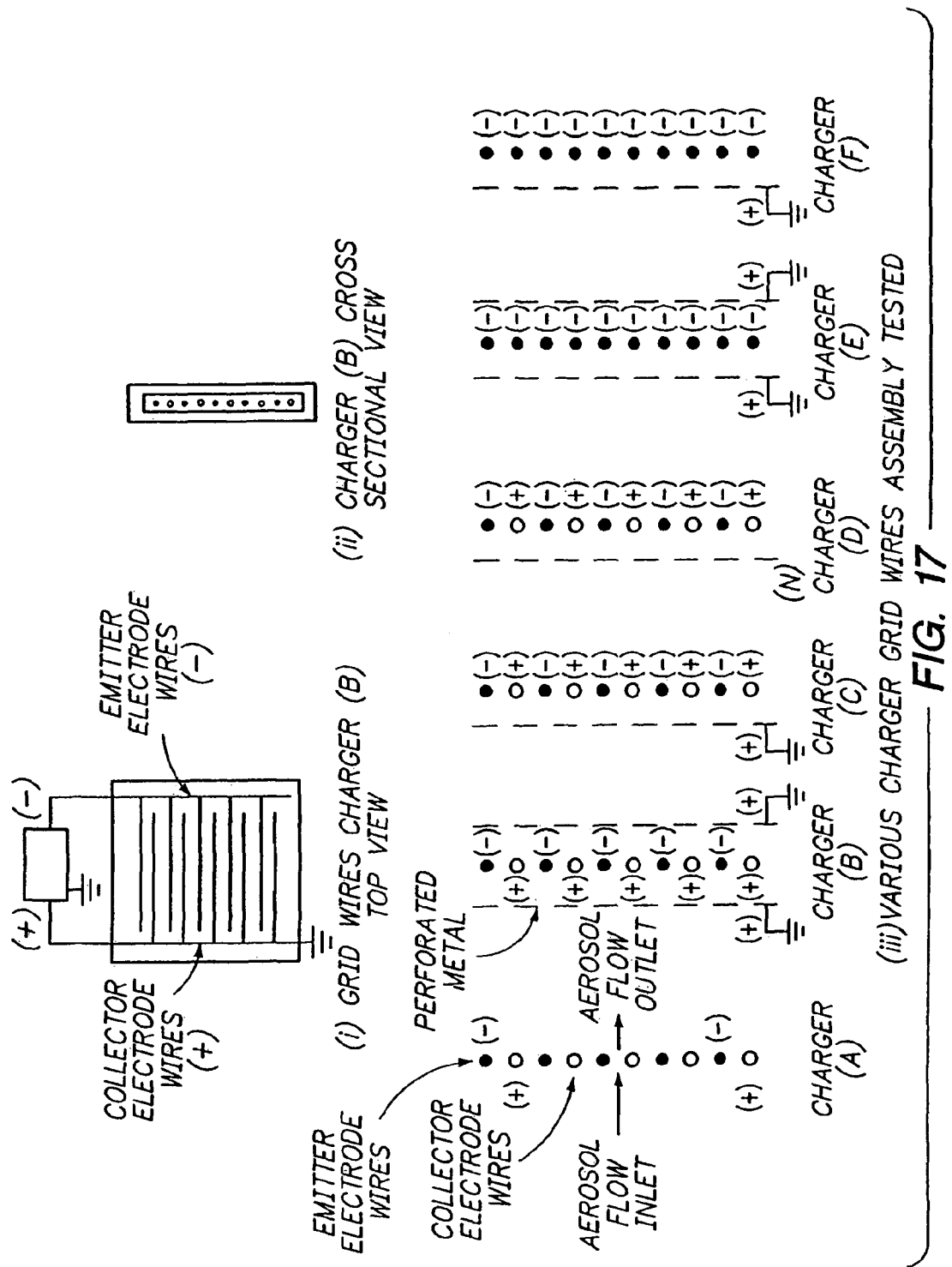

As discussed above, corona charger apparatus includes a plurality of electrodes. Such electrodes may be pattered in a number of ways. A few electrode patterns (grid patterns) that may be used to design the corona charger apparatus are shown in FIGS. 15-17.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

What is claimed is:

1. An electrically stimulated catalytic converter apparatus for treating engine exhaust from a vehicle engine, said electrically simulated catalytic converter apparatus comprising:
   an exhaust conduit having a first end and a second end; said first end adapted to be operatively connected to an exhaust pipe and defining a main flow path therethrough;

a housing unit operatively attached to the exhaust conduit, the housing unit having a hollow space formed therein which is in fluid communication with the exhaust conduit and disposed in fluid communication with the main flow path;

a corona charger apparatus disposed in the housing unit; said corona charger apparatus comprising a first charger grid section disposed proximate an inlet of the housing and comprising at least four spaced apart alternating positive and negative electrodes connected to a voltage supply unit, and a second charger grid section disposed proximate an outlet of the housing and comprising at least four spaced apart alternating positive and negative electrodes connected to said voltage supply unit; and a porous ceramic monolith disposed between the first and second charger grid sections and having a coating therein comprising a metal selected from the group consisting of platinum, palladium, rhodium and mixtures thereof;

wherein the corona charger apparatus is operable, when energized, to produce charged gaseous ions which interact with the engine exhaust.

2. The electrically stimulated catalytic converter apparatus according to claim 1, further comprising a pre-charger unit disposed in the main flow path of the engine exhaust upstream of the corona charger apparatus; wherein the pre-charger unit includes at least one electrode connected to the voltage supply unit.

3. The electrically stimulated catalytic converter apparatus according to claim 1, further comprising another corona charger apparatus disposed between the first and the second end of the exhaust conduit; and wherein said corona charger apparatuses are disposed parallel to each other.

4. The electrically stimulated catalytic converter apparatus according to claim 1, wherein said electrode is formed of a material selected from the group consisting of tungsten, platinum, alloys of tungsten, alloys of platinum and mixtures thereof.

5. The electrically stimulated catalytic converter apparatus according to claim 1, further comprising a fluid/air source unit; wherein said housing unit comprises a first opening and a second opening; wherein the corona charger is operatively connected with the exhaust conduit via the first opening; and the second opening is attached to the fluid/air source unit.

6. The electrically stimulated catalytic converter apparatus of claim 1, wherein each of the first and second charger grid sections comprises a plurality of charger grids disposed in a stacked arrangement, each of said charger grids comprising at least four spaced apart alternating positive and negative electrodes.

7. The electrically stimulated catalytic converter apparatus according to claim 1, wherein each of the first and second charger grid sections comprises three positive electrode wires alternated with three negative electrode wires in a substantially parallel arrangement.

* * * * *